United States Patent
Scott et al.

(10) Patent No.: US 7,726,563 B2
(45) Date of Patent: Jun. 1, 2010

(54) SYSTEM AND METHOD FOR PROVIDING OPTIMIZED SHOPPING LIST

(76) Inventors: John Scott, 16 Fencerow Way, Nepean, Ontario (CA) K2J 4X8; Paul Davis, 9 Taj Court, Ottawa, Ontario (CA) K1G 5K6

( * ) Notice: Subject to any disclaimer, the term of this patent is extended or adjusted under 35 U.S.C. 154(b) by 1139 days.

(21) Appl. No.: 11/261,444

(22) Filed: Oct. 28, 2005

(65) Prior Publication Data

US 2006/0113383 A1 Jun. 1, 2006

Related U.S. Application Data

(60) Provisional application No. 60/668,986, filed on Apr. 7, 2005, provisional application No. 60/522,728, filed on Nov. 1, 2004.

(51) Int. Cl.
*G06K 15/00* (2006.01)
(52) U.S. Cl. .......................... 235/383; 235/385; 705/26
(58) Field of Classification Search ................. 235/383, 235/385; 705/26
See application file for complete search history.

(56) References Cited

U.S. PATENT DOCUMENTS

| | | | |
|---|---|---|---|
| 5,414,838 A | 5/1995 | Kolton et al. | |
| 5,590,325 A | 12/1996 | Kolton et al. | |
| 5,778,357 A | 7/1998 | Kolton et al. | |
| 6,311,194 B1 | 10/2001 | Sheth et al. | |
| 6,386,450 B1 * | 5/2002 | Ogasawara | 235/383 |
| 6,430,554 B1 | 8/2002 | Rothschild | |
| 6,651,053 B1 | 11/2003 | Rothschild | |
| 6,714,941 B1 | 3/2004 | Lerman et al. | |
| 6,758,397 B2 * | 7/2004 | Catan | 235/385 |
| 6,898,571 B1 * | 5/2005 | Val et al. | 705/14 |
| 7,010,534 B2 | 3/2006 | Kraft | |
| 7,051,036 B2 | 5/2006 | Rosnow et al. | |
| 7,069,238 B2 | 6/2006 | I'Anson et al. | |
| 7,249,708 B2 * | 7/2007 | McConnell et al. | 235/383 |
| 7,599,855 B2 * | 10/2009 | Sussman | 705/26 |
| 2001/0018671 A1 | 8/2001 | Ogasawara | |
| 2001/0032130 A1 | 10/2001 | Gabos | |
| 2001/0034658 A1 | 10/2001 | Silva et al. | |
| 2001/0039519 A1 | 11/2001 | Richards | |
| 2002/0013737 A1 | 1/2002 | Arai | |
| 2002/0026363 A1 | 2/2002 | Dunaway, Jr. | |
| 2002/0026380 A1 | 2/2002 | Su | |
| 2002/0035536 A1 | 3/2002 | Gellman | |
| 2002/0049637 A1 | 4/2002 | Harman et al. | |
| 2002/0065734 A1 * | 5/2002 | Kuo | 705/26 |
| 2002/0072989 A1 | 6/2002 | Van De Sluis | |
| 2002/0087415 A1 | 7/2002 | Allen et al. | |
| 2002/0120496 A1 | 8/2002 | Scroggie et al. | |
| 2002/0120627 A1 * | 8/2002 | Mankoff | 707/10 |

(Continued)

OTHER PUBLICATIONS http://froogle.google.com (printed Apr. 10, 2006, 1 page).

(Continued)

*Primary Examiner*—Seung H Lee
(74) *Attorney, Agent, or Firm*—Shumaker & Sieffert, P.A.

(57) ABSTRACT

Method and system for providing an optimized shopping list for grocery items based on preferences such as geographical market, retail grocery brand, dietary requirement of the shopper. Shoppers may retrieve, and update a stored list or generate a new list at a regular time interval, taking the advantage of time-dependent movement of the price.

16 Claims, 5 Drawing Sheets

U.S. PATENT DOCUMENTS

| | | |
|---|---|---|
| 2002/0133421 A1 | 9/2002 | Hutchens |
| 2002/0138345 A1 | 9/2002 | Dickson et al. |
| 2002/0147642 A1 | 10/2002 | Avallone et al. |
| 2002/0161658 A1 | 10/2002 | Sussman |
| 2002/0174021 A1 | 11/2002 | Chu et al. |
| 2002/0178013 A1 | 11/2002 | Hoffman et al. |
| 2002/0178014 A1 | 11/2002 | Alexander |
| 2002/0178088 A1 | 11/2002 | Lurie et al. |
| 2002/0184109 A1 | 12/2002 | Hayet et al. |
| 2002/0194604 A1 | 12/2002 | Sanchez et al. |
| 2003/0004831 A1 | 1/2003 | Owens |
| 2003/0018522 A1 | 1/2003 | Denimarck et al. |
| 2003/0018534 A1 | 1/2003 | Zack et al. |
| 2003/0065575 A1 | 4/2003 | Berkema |
| 2003/0110078 A1 | 6/2003 | Chang et al. |
| 2003/0130909 A1 | 7/2003 | Caci et al. |
| 2003/0167203 A1 | 9/2003 | Thorne et al. |
| 2003/0172005 A1 | 9/2003 | Hellal et al. |
| 2003/0225632 A1 | 12/2003 | Tong et al. |
| 2004/0093274 A1 | 5/2004 | Vanska et al. |
| 2004/0117276 A1 | 6/2004 | Kettler, III |
| 2004/0128210 A1 | 7/2004 | Gabos et al. |
| 2004/0181456 A1 | 9/2004 | Matsumori |
| 2005/0060232 A1 | 3/2005 | Maggio |
| 2005/0071216 A1 | 3/2005 | Yoshitake et al. |
| 2005/0075940 A1 | 4/2005 | DeAngelis |
| 2005/0080683 A1 | 4/2005 | Jordan |
| 2005/0102181 A1 | 5/2005 | Scroggie et al. |
| 2005/0160006 A1 | 7/2005 | Pate |
| 2005/0165649 A1 * | 7/2005 | Mahaffey et al. ............ 705/26 |
| 2005/0189414 A1 | 9/2005 | Fano et al. |
| 2005/0189415 A1 | 9/2005 | Fano et al. |
| 2005/0203810 A1 | 9/2005 | Listenberg |

OTHER PUBLICATIONS http://www.shopzilla.com (printed Apr. 10, 2006, 5 pages).
http://www.amazon.com/ (printed Apr. 10, 2006, 4 pages).
http://www.bestbuy.ca/home.asp (printed Apr. 10, 2006, 3 pages).
http://www.loeb.ca/ (printed Apr. 10, 2006, 1 page).
http://www.heb.com/welcome/index.jsp (printed Apr. 10, 2006, 1 page).
http://www.loblaws.ca/this_weeks_flyer.html (printed Apr. 10, 2006, 2 pages).
http://www.flyertimes.com/ (printed Apr. 10, 2006, 3 pages).

* cited by examiner

SYSTEM AND METHOD FOR PROVIDING OPTIMIZED SHOPPING LIST

The present application claims the benefit of U.S. Provisional Applications No. 60/522,728, filed Nov. 1, 2004, entitled "Method for comparing prices on-line and generating an optimized shopping list that identifies the best advertised and in-store prices among "brick and mortar" retailers", and No. 60/668,986, filed on Apr. 7, 2005, entitled "System and Method for Providing Optimized Shopping List", the contents of which are hereby herein incorporated by reference.

FIELD OF INVENTION

The present invention relates to on-line shopping. More specifically, the present invention relates to on-line price comparison shopping.

BACKGROUND OF THE INVENTION

The Internet is by far the largest, most extensive publicly available network of interconnected computer networks. The Internet has become an extremely popular source of virtually all kinds of information. Increasingly sophisticated computers, software, and networking technology have made Internet access relatively straightforward for end users.

As a result, on-line shopping is increasing. On-line shopping continues to evolve from a means of providing an easy way of accessing information on the Internet to a virtual marketplace. With the growth of on-line commerce, price comparison has become a dominant theme for making an informed purchasing decision for on-line shoppers. A simple form of comparison shopping would be sequential visiting the web site of various vendors and comparing prices, clearly a time consuming and laborious task for the shopper.

The on-line shopping has also penetrated the grocery industry, although the grocery shopping is characterized by many factors, for example, the freshness of the produce, the delivery cost, which are unique to the on-line shopping. In addition, the grocery industry is also facing the challenge of decreasing customer loyalty. The proliferation of flyers (also called preprints, inserts) in the daily newspapers is evidence of the consumers' desire for grocery deals. Proactive consumers, often called the prosumers, will plan their grocery shopping trips based on the deals advertised in the weekend grocery flyers. Therefore, the grocery industry continues to spend considerable resource producing these flyers on a weekly basis.

There are several existing comparison shopping web sites that identifies a best price for a single item, for example:

http://froogle.google.com http://www.shopzilla.com

These sites, however, cannot automatically provide the best price for a list of heterogeneous items. They are essentially search engines that allow a shopper to enter a key word. In response to the shopper's query, the search engines return a set of corresponding web-based matches listing the vendors, or vendors' web sites that offer the desired items. The technology is based on a web crawler systematically accessing web pages by sequentially following hypertext links from page to page. The crawler indexes the pages for use by the search engines from information about a web page as provided by its address or Universal Resource Locator (URL), metadata, and other criteria found within the page. The crawler is run periodically to update previously stored data and to append information about newly created web pages.

The information compiled by the crawler is stored in a metadata repository or database. The search engines search this repository to identify matches for the shopper-defined search rather than attempt to find matches in real time.

On the other hand, at the on-line shopping site of a retailer, for example at http://www.amazon.com/ http://www.bestbuy.ca/home.asp while a shopper can prepare a list of items for purchase, the price provided at these sites is the selling price for the product at that on-line shopping site and price comparison feature is only possible by sequentially visiting different sites. However, sequential comparison shopping can be inaccurate in that an individual shopper may not cover all the web sites offering the desired items, potentially leading to missed shopping opportunities such as lowest price, better quality or service and so forth.

Similarly, most major grocery store chains maintain an on-line presence, many of which also offer the ability to prepare a shopping list:

http://www.loeb.ca/ http://www.heb.com/welcome/index.jsp

Both grocery stores and third-party sites also post the weekly flyers http://www.loblaws.ca/this_weeks_flyer.html http://www.flyertimes.com/

Those sites, however, do not provide price comparison.

A known method describes steps of letting an online comparison shopping site create a purchase order for purchasing all items on a list. However, the method of finding a solution is limited to a dichotomic situation: either an optimal solution is found or it is not found, and if it is not found then the user is notified of failure. It also does not address any other variables which could be correlated to the price under consideration. Moreover, the method does not utilize more than one variable concurrently to reach an optimized solution.

There is, therefore, a need to provide a method and system that provides shoppers an optimized shopping list based on more than one variable which directly affect the shopper.

SUMMARY OF THE INVENTION

According to one aspect of the present invention there is provided a method of providing a shopping list for grocery items by a web application comprising the steps of: a) receiving information from an information provider; b) storing the received information in a database at the web application; c) receiving an input having a list and a requirement; said list including a plurality of items; d) determining presence of each item of the list in the database based on the requirement; e) optimizing the items of the list using the received information in the database; and f) generating an optimized shopping list of the items.

According to another aspect of the present invention there is provided a computer readable medium storing instructions or statements for use in the execution in a computer of a method for providing a shopping list for grocery items by a web application, the method comprising the steps of: receiving information from an information provider; storing the received information in a database at the web application; receiving an input having a list and a requirement; said list including a plurality of items; determining presence of each item of the list in the database based on the requirement optimizing the items of the list using the received information in the database; and generating an optimized shopping list of the items.

According to another aspect of the present invention there is provided a computer system comprising: a memory having microcontroller-readable code embedded therein for providing a shopping list for grocery items by a web application, said code comprising: a) code means for receiving information from an information provider; b) code means for storing the received information in a database at the web application; c) code means for receiving an input having a list and a requirement; said list including a plurality of items; d) code means for determining presence of each item of the list in the database based on the requirement; e) code means for optimizing the items of the list using the received information in the database; and f) code means for generating an optimized shopping list of the items.

BRIEF DESCRIPTION OF THE DRAWINGS

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein.

DETAILED DESCRIPTION OF A PREFERRED EMBODIMENT

Figure 1:
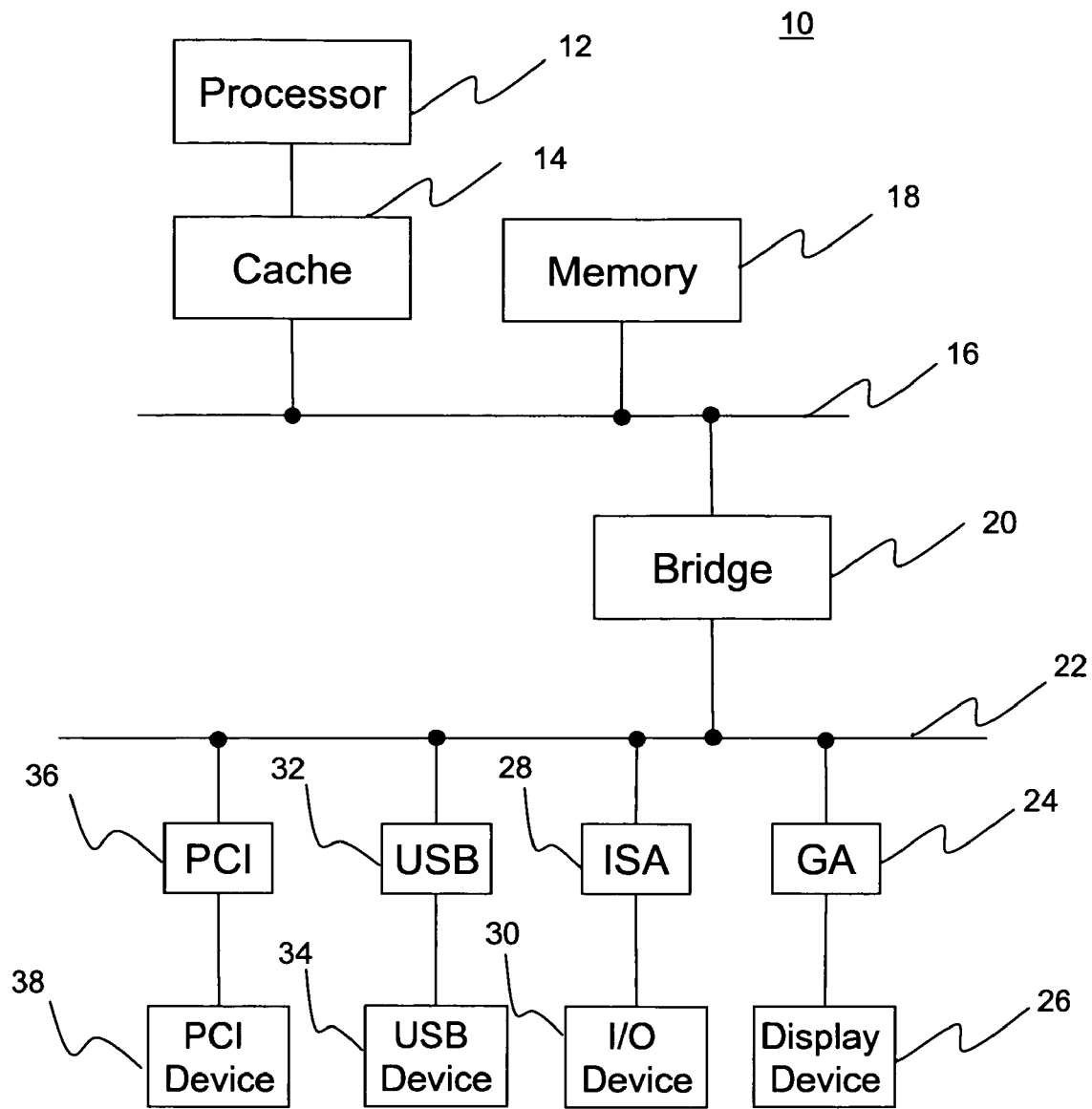
FIG. 1 shows a block diagram of a system in which a preferred embodiment of the present invention may be implemented.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The term "client-server" is intended to include a model of interaction in a distributed system in which an application at one site sends a request to an application at another site and waits for a response. The requesting application is called the "client"; and the application, which responds to the request, is called the "server". In the context of the World Wide Web, the client is typically a "Web browser", which runs on a user's computer; the application which responds to Web browser requests at a Web site is commonly referred to as a "Web server application."

The term "coupon" is intended to include discounts offered by manufacturers and others as an incentive to purchase any particular grocery item. Coupons typically include restrictions such as period of validity, quantity of product that must be purchased, and package size limitations.

The term "diet requirement" is intended to include specific directions to be followed by individuals adhering to any particular diet. Examples, of diet requirements include, but are not limited to, the following: low fat, no fat, low sugar, no sugar, no salt, no carbohydrates, etc. Diet requirements may also include specific grocery items.

The term "grocery item" is intended to include specific products commonly sold by grocery stores. A grocery item is not necessarily limited to food products.

The term "grocery Item information" is intended to include information about a specific grocery item. Grocery Item information includes, but is not limited to, manufacturer, brand name, product name, container size, price, price per unit, discounts, special offer pricing and nutrition information.

This term "grocery store" is sometimes used herein to refer to retail outlets whose primary business is sale of food products to the public from a geographic location.

The term "shopping list" is intended to include a list of specific grocery items the user intends to purchase. The list may include, but is not limited to, the following: brand name, product, UPC code, number of items, package size, price per package, extended price, shelf location, etc.

The term "shopping area: is intended to include a geographic area, selected by a user, in which the user wishes to shop for groceries. A shopping area may be based on a specified distance from a certain point.

The term "on-line shopping transaction" is intended to include business transactions conducted online using the Internet or another communications network.

The term "flyer" is intended to include promotional information provided by grocery store, manufacture or the like in newspapers, magazines, over radios, televisions, Internet or any other media.

Referring to FIG. 1, a block diagram of a system in which a preferred embodiment of the present invention may be implemented is illustrated. The system (10) may be, for example, one of the general purpose computers. The system (10) includes processor (12), which in the exemplary embodiment are each connected to cache memory (14), the cache (14) is connected in turn to a system bus (16).

Also connected to system bus (16) are a system memory (18) and a host bridge (20). Host bridge (20) connects I/O bus (22) to system bus (16), relaying and/or transforming data transactions from one bus to the other. In the exemplary embodiment, the system (10) includes graphics adapter (24) connected to I/O bus (22), receiving user interface information for display device (26). Peripheral devices such as universal serial bus devices (34), and input/output (I/O) device (30), which may include a conventional mouse, a key board, or the like, are connected via an Industry Standard Architecture (ISA) bridge (28), or a Universal Serial Bus (USB) bridge (32) to I/O bus (22), respectively. Host bridge (20) is also connected to PCI device (38) via PCI bridge (36).

The exemplary embodiment shown in FIG. 1 is provided solely for the purposes of explaining the invention and those skilled in the art will recognize that numerous variations are possible, both in form and function. For instance, the system (10) may also include a digital video disk (DVD) drive, and numerous other optional components. All such variations are believed to be within the spirit and scope of the present invention. The system (10) and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
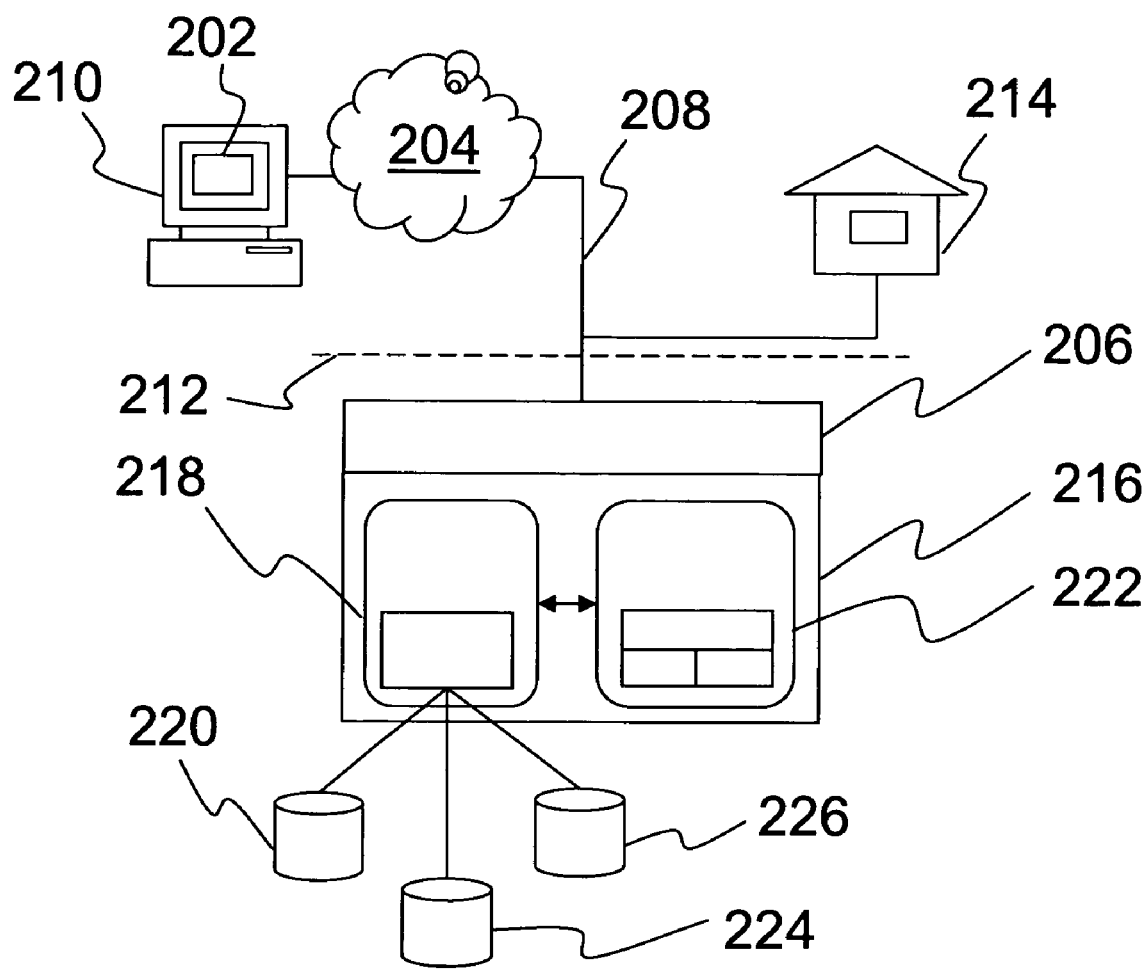
FIG. 2 shows a block diagram of a system for providing shopping list for grocery items according to one embodiment of the present invention.

FIG. 2 shows an embodiment of the present invention where a client interface (202) is connected to a Web server platform (206) via a communication channel (208). For illustrative purposes, channel (208) is the Internet (204), or other known network connection. Web server (206) may be one of a plurality of servers which are accessible by clients. A client (202) may be a browser run on a client communication device (210), a browser is a known software tool used to access the servers of the network. Representative browsers include, among others, Netscape Navigator, Microsoft Internet Explorer, Mozilla Firefox or the like, each of which are "off-the-shelf" or downloadable software programs. The client communication device (210) is any existing device that allows a user to access the Web server (206), and can be, for example, a PC (personal computer), a wireless PDA, a smart phone, a WebTV device, a two-way pager, or a mobile phone. The Web server (206) supports files in the form of hypertext documents and objects.

A representative Web server (206) may have a firewall (212). An information provider (214), for example, a grocery store, a newspaper publisher, a distributor or a manufacture, may provide the coupon or flyer information directly to the server (206). The server further directs the client requests and response to and from the web application (216). The web application (216) in accordance with the present invention may include a database management component (218). The database management component (218) administrates the user account information and stores that information in an authorization and authentication database (220). The database management component (218) may further manage the promotion information and price information in a price database (224), the grocery item information, the diet requirement information in a grocery information database (226). Other databases may include saved customized shopping list, database for manufacture regarding the shoppers in the community. The user account information may further include, but not limited to, number and age of members in the household, secondary preferences such as store preference, shopping area preference, retail brand preference, or any other personalized information. The price database (224) may include price information both entered manually or obtained directly in electronically form from information provider (214). The price information may be obtained from weekly flyers, irregular flyers, catalogues, manufacture or store coupons, advertisements in newspapers, magazines, on radio, television, or any other media means. The price information may by default be the primary requirement information, i.e. the generated shopping list is optimized to the lowest price. The grocery item information may include: package label warnings; UPC code; package size etc. The diet information may include: fat-free, low fat, low saturated fat, trans fat free, no cholesterol, high fiber, low carbohydrate, low sodium, or organic. While some of the diet information may be personal preference, other may be requirement for a shopper. The diet requirement information may usually be a secondary requirement, for example, trans fat free. The diet requirement may also be input individually, and/or stored in the database as primary requirement, for example, allergy avoidance requirement is a primary requirement for a shopper with allergy.

The grocery item shopping list generation module (222) generates an optimized shopping list for grocery items using the grocery item information in the databases and user provided information as described below.

Figure 3:
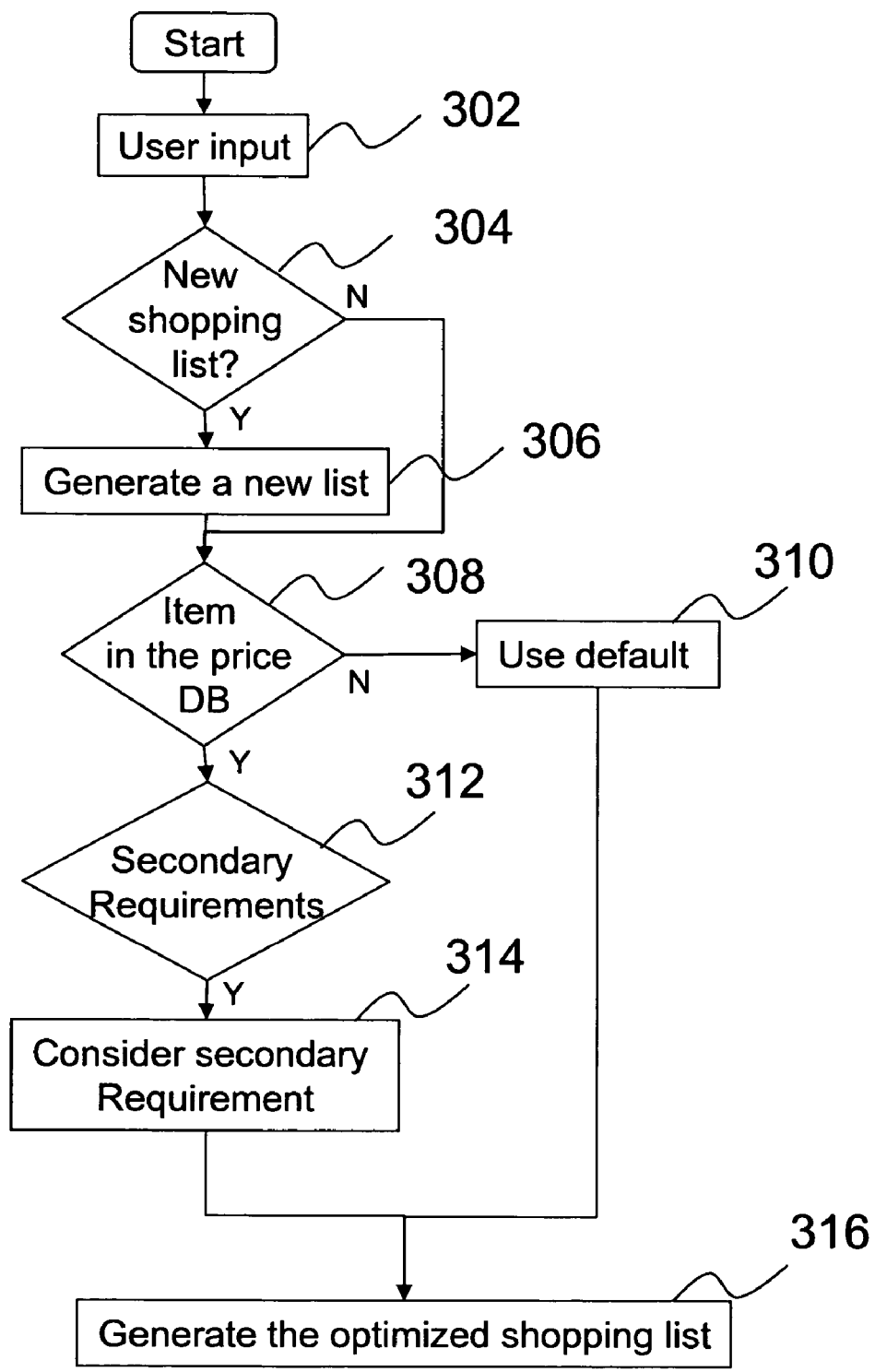
FIG. 3 is a flowchart illustrating the processing steps of a method for providing shopping list for grocery items according to one embodiment of the present invention.

Referring to FIGS. 2 and 3, in accordance to an embodiment of the present invention, the user input is received at the web application (216) at step (302). The grocery list generation module (222) will examine whether this requested list is already stored in the database (304). A new shopping list will be generated (306) if no existing one can be found based on the user input. Each of the items on the list will then be first examined based on a primary requirement, for example, based on the price information (308). If the requirement cannot be met, for example, in case the item is not in the price database (224), a default or replacement value will be entered (310). If the item meets the first requirement, further requirements will be considered (312) and the item chosen based on the optimization of all requirements. Although only one step (314) is illustrated in FIG. 3, it should be apparent to a person skilled in the art, that this may be a process involving more than one iteration to optimize the shopping list based on more than one input requirement. The shopping list is then generated (316).

Figure 4:
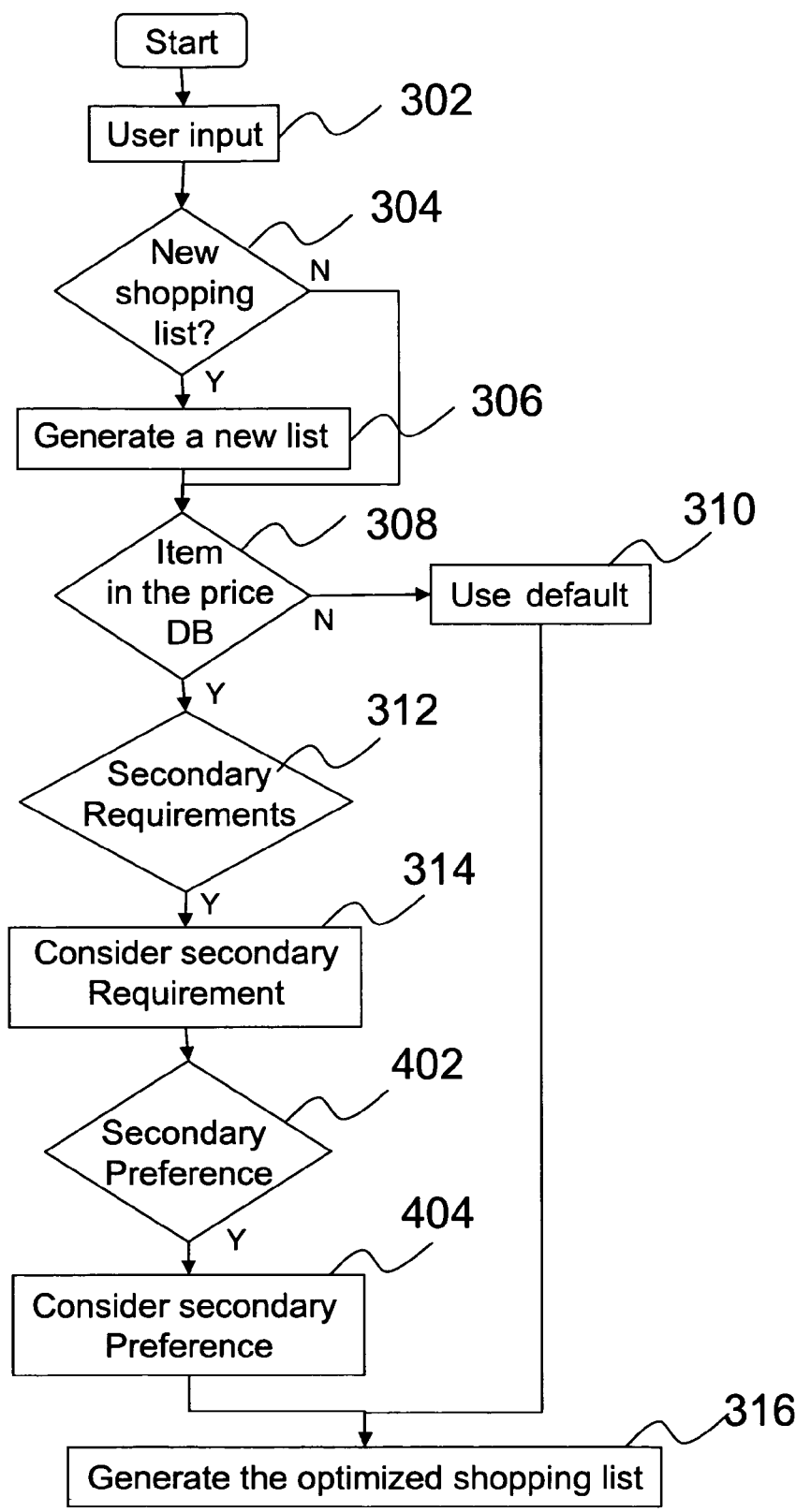
FIG. 4 is a flowchart illustrating the processing steps of another method for providing shopping list for grocery items according to one embodiment of the present invention.

Optionally, referring to FIG. 4, the shopping list is considered for secondary preferences at step (402, 404). Secondary preferences could, for example, be weighted differently compared to the primary and secondary requirements. This weighting information may be stored in the database, or input by the user on-line at shopping list generation time.

The generated shopping list may be displayed on the client (202) in a browser, printed or downloaded to a different device.

Figure 5:
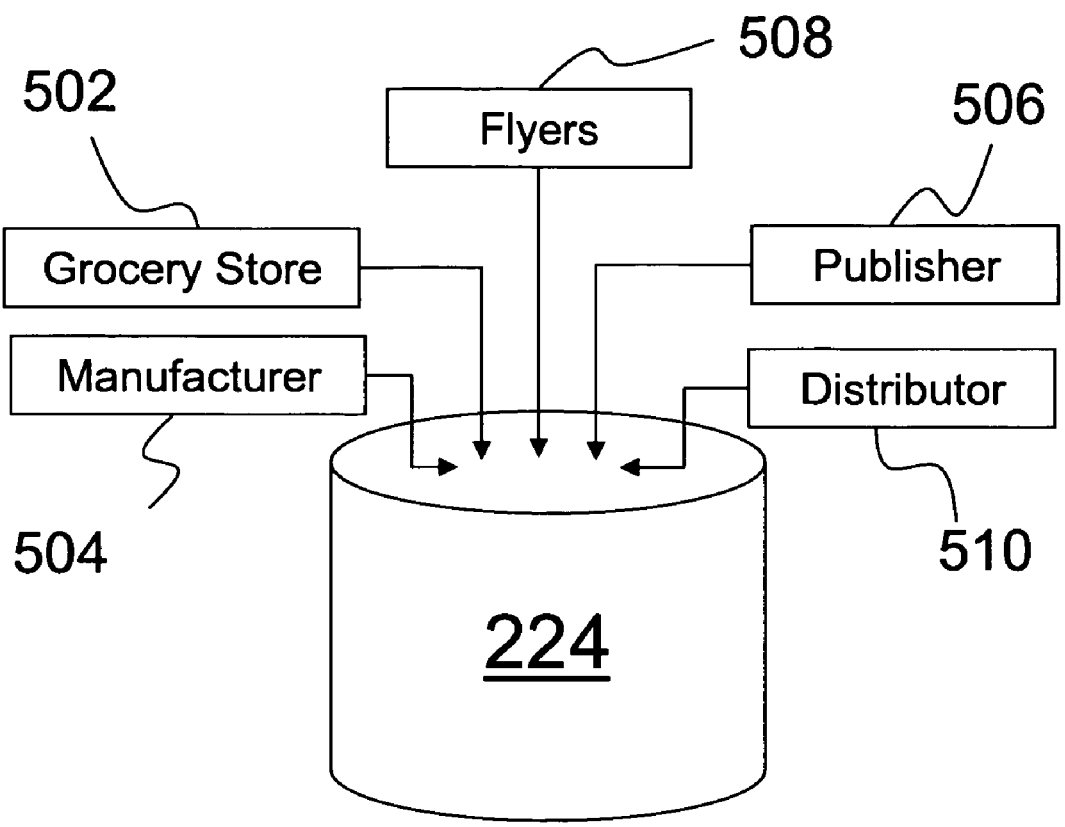
FIG. 5 shows a block diagram of the updating of a database used in one embodiment of the present invention.

Referring to FIG. 5, the price database (224) may be updated by: direct information transferred from the grocery stores (502); manufacturers (504); publishers of newspapers, magazines (506) or distributors (510). The flyers which may be available on a regular or irregular basis, may be input into the database (224) either automatically, or manually (508).

The present invention provides a method and system to provide a shopping list for grocery items by optimizing on one or more than one requirements. The shopper does not need look at different information sources, for example, flyers to determine the best suitable store to shop.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method of providing a shopping list for grocery items by a web application comprising the steps of:
    a) receiving a price information from an information provider;
    b) storing the received price information in a database at the web application;
    c) receiving an input having a list including a plurality of items and a price requirement;
    d) determining presence of each item of the list in the database based on the requirement;
    e) optimizing the items of the list using the received information in the database; and
    f) generating an optimized shopping list of the plurality of items.

2. The method as claimed in claim 1, wherein the database further stores dietary information.

3. The method as claimed in claim 1, wherein the plurality of items includes grocery items.

4. The method as claimed in claim 1, wherein the information provider is selected from the group consisting of grocery store, newspaper publisher, distributor, manufacturer and a combination thereof.

5. The method as claimed in claim 1, wherein the information is provided by a flyer.

6. The method as claimed in claim 5, wherein the information in the flyer is input manually in the database.

7. The method as claimed in claim 1, further comprising the steps of:
    a) determining presence of each item of the list in the database based on a dietary requirement; and
    b) optimizing the items of the list using the received information in the database, the price requirement and the dietary requirement.

8. The method as claimed in claim 7, further comprising the steps of:
    optimizing the items of the list using the received information in the database, the price requirement, the dietary requirement and a personal preference.

9. The method as claimed in claim 1, wherein the input is received in a user input.

10. The method as claimed in claim 1, wherein the database is the first database, and the input is received from a second database of the web application.

11. A computer readable medium storing instructions or statements for use in the execution in a computer of a method for providing a shopping list for grocery items by a web application, the method comprising the steps of:
    a) receiving a price information from an information provider;
    b) storing the received price information in a database at the web application;
    c) receiving an input having a list including a plurality of items and a price requirement;
    d) determining presence of each item of the list in the database based on the requirement;
    e) optimizing the items of the list using the received information in the database; and
    f) generating an optimized shopping list of the plurality of items.

12. The computer readable medium as claimed in claim 11, wherein the plurality of items includes grocery items.

13. The computer readable medium as claimed in claim 11, wherein the information provider is a flyer.

14. A computing device comprising:
    a) receiver for receiving a price information from an information provider;
    b) storage for storing the received price information in a database at the web application;
    c) receiver for receiving an input having a list including a plurality of items and a price requirement;
    d) means for determining presence of each item of tbe list in the database based on the requirement;
    e) optimizer for optimizing the items of the list using the received information in the database; and
    f) generator for generating an optimized shopping list of the plurality of items.

15. The computing device as claimed in claim 14, wherein the plurality of items includes grocery items.

16. The computing device as claimed in claim 14, wherein the information provider is a flyer.

* * * * *